United States Patent

Ellis

[15] 3,669,076
[45] June 13, 1972

[54] ROTATABLE HOPPER LIVESTOCK FEED DISPENSER

[72] Inventor: Jacob B. Ellis, Route 2, P.O. Box 2116, Okmulgee, Okla. 74447

[22] Filed: June 24, 1970

[21] Appl. No.: 49,216

[52] U.S. Cl. ............................................ 119/52 B, 222/169
[51] Int. Cl. ................................................................ A01k 5/02
[58] Field of Search ................. 119/29, 56, 52, 52 B, 52 AF; 198/125; 222/167, 169

[56] References Cited

UNITED STATES PATENTS

| 3,191,577 | 6/1965 | McMurray | 119/52 B |
| 3,205,859 | 9/1965 | Fine et al. | 119/52 B |
| 2,663,282 | 12/1953 | Ingle | 119/29 |
| 1,956,937 | 5/1934 | Van Kleek | 119/29 |
| 3,424,132 | 1/1969 | Fischer et al. | 119/29 |
| 3,148,663 | 9/1964 | Conover | 119/56 R |

*Primary Examiner*—Aldrich F. Medbery
*Attorney*—William S. Dorman

[57] ABSTRACT

A feed dispenser apparatus comprising a storage hopper mounted on a support tower, said hopper being rotatable about its own longitudinal axis. A feed dispensing conduit is carried by the hopper and is in open communication therewith for receiving the feed therefrom and dispensing the feed to a circular or annular feed trough. The dispensing conduit moves simultaneously with the rotatable hopper for distributing the feed substantially uniformly into the feed trough. A feed screw or auger mechanism is rotatably mounted within the feed dispensing conduit for facilitating movement of the feed therethrough and discharging of the feed therefrom.

4 Claims, 3 Drawing Figures

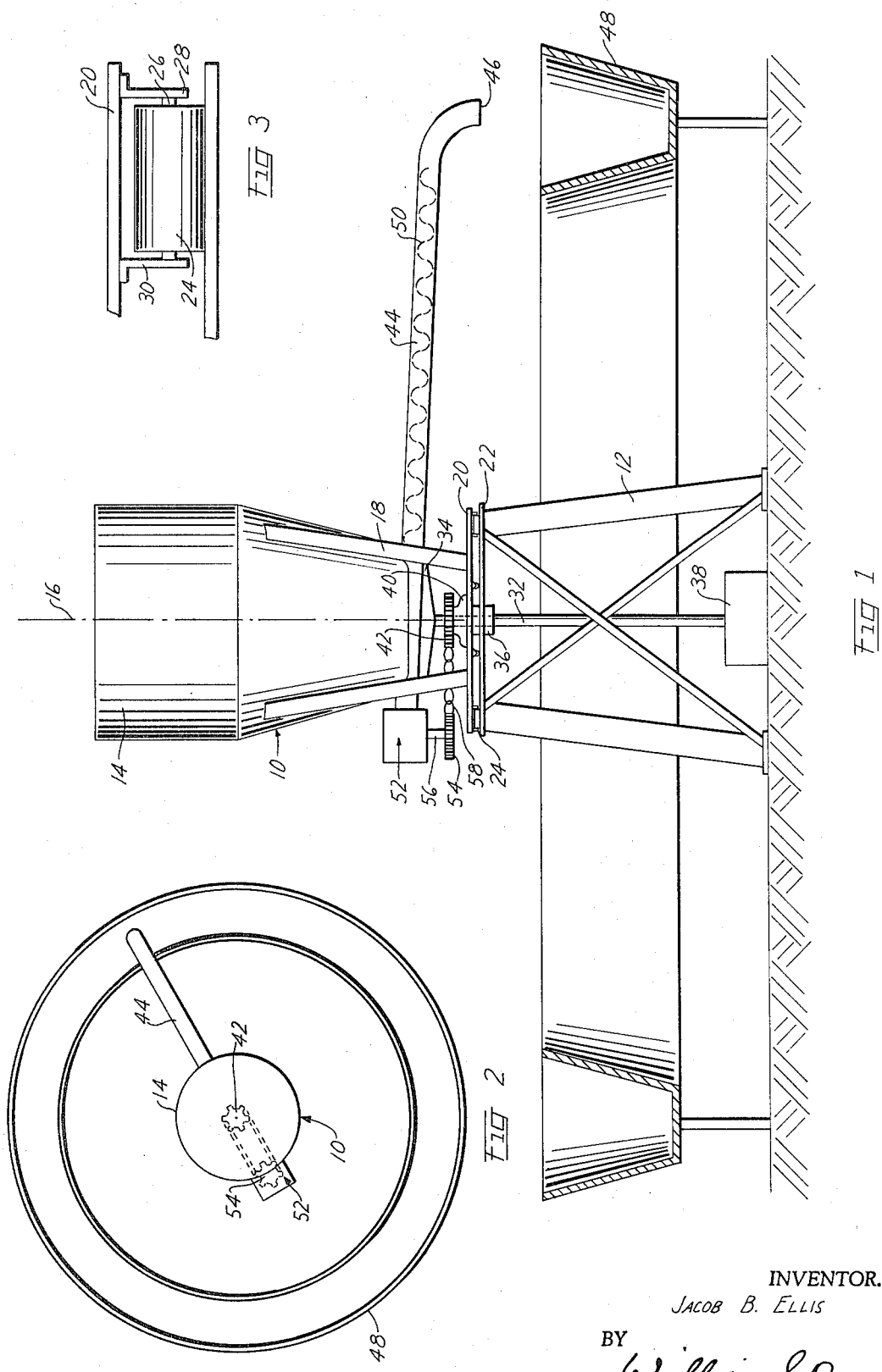

ROTATABLE HOPPER LIVESTOCK FEED DISPENSER

This invention relates to improvements in feeding devices and more particularly, but not by way of limitation, to a self-feeding storage structure.

Stock feeding machines which automatically deliver feed from a storage hopper or bin to a feed trough and having time controlled switches and motors for operating the apparatus are well known and many of these devices are in use today. The self-feeding apparatus shown in the E.G. Duerringer U.S. Pat. No. 2,704,995, issued Mar. 29, 1955 and entitled "Self-Feeding Storage Structure" is an example of one type of such automatic stock feeding machines. The present day devices for automatically dispensing feed to a feed trough are usually expensive and of a large construction, and as a result it is difficult for the operator of a relatively small establishment to utilize these present day self-feeding devices.

The present invention relates to a novel self-feeding storage device for livestock, and the like, which is particularly designed and constructed for simplicity in operation, and economy of structure. The novel device comprises a storage hopper rotatably mounted on a stationary support. The support structure and rotatable hopper is substantially centrally disposed within a circular or annular feed trough and a conveyor conduit which is carried by the hopper extends from the hopper to the proximity of the feed trough. The conveyor or feed delivery conduit is in open communication with the interior of the hopper for receiving feed therefrom. A feed screw or auger extends longitudinally through the feed tube and is rotated therein for facilitating movement of the feed therethrough for delivery or dispersion into the feed trough as the hopper rotates about its longitudinal axis. The feed is distributed substantially uniformly and evenly to the feed trough during rotation of the hopper. The novel self-feeding storage bin is simple and efficient in operation and economical and durable in construction.

It is an important object of this invention to provide a novel self-feeding storage bin for automatically delivering feed from the storage bin to the feed trough.

It is another object of this invention to provide a novel self-feeding storage bin which is particularly designed and constructed for economy of use and construction.

Other and further objects and advantageous features of the present invention will hereinafter more fully appear in connection with a detailed description of the drawings in which:

FIG. 1 is a side elevational view partly in section of a livestock feed apparatus embodying the invention.

FIG. 2 is a plan view of a livestock feeder and apparatus embodying the invention.

FIG. 3 is an enlarged view of a support roller utilized in the invention.

Referring to the drawings in detail, reference character 10 generally indicates a self-feeding storage structure or livestock feed dispenser comprising a suitable stationary support tower 12 having a storage bin or feed hopper 14 mounted thereon for rotation about the longitudinal axis 16 thereof. The hopper 14 may be of any suitable well known structure or configuration and is supported by a plurality of spaced substantially upright leg members 18 which are rigidly secured or otherwise suitably secured to a disc or plate 20. The disc 20 is rotatably supported on an upper plate member 22 of the support structure 12 by a plurality of circumferentially spaced rollers 24. As depicted herein each roller 24 is journalled on a shaft 26 which extends between a pair of spaced support brackets 28 and 30 which in turn are rigidly secured in any well known manner to the lower surface of the disc 20. The brackets 28 and 30 are disposed on the disc 20 in such a manner that each roller 24 is radially disposed with respect to the center of the disc for facilitating rotation of the disc 20 on the plate 22 for a purpose and in a manner as will be hereinafter set forth.

A substantially centrally disposed drive shaft 32 is secured to the legs 18 in any well known manner such as by a bracket 34. The shaft 32 extends downwardly through a bearing sleeve or bushing 36 which is rigidly secured to the plate 22 in any well known manner. The shaft 32 extends downwardly through the tower structure 12 and into drive connection with a suitable drive assembly generally indicated at 38 in FIG. 1. The drive assembly includes a motor and reduction gear if desired and functions in the usual manner for transmitting rotation to the drive shaft 32 for rotation of the hopper 14 for a purpose as will be hereinafter set forth.

The bushing or bearing sleeve 36 extends through the disc 20 and a support flange 40 is rigidly secured to the upper end thereof in any well known manner and remains stationary therewith. A gear member or sprocket 42 is secured to the upper end of the support flange 40 and remains stationary therewith.

Of course, suitable time-controlled switches (not shown) may be provided for the drive assembly 38 for periodic operation of suitable hopper valves (not shown), if desired, as is well known, for periodic discharge of the feed from the hopper 14 into the feed conveyor conduit 44.

A feed distribution conduit 44 is rigidly secured to the lower end of the hopper 14 in any suitable manner (not shown) and is in open communication with the interior thereof as is well known for receiving the feed therefrom. The feed conduit 44 extends radially outwardly from the hopper 14 and is preferably disposed at a slight downward angle with respect to the horizontal whereby gravity assists in moving the feed through the conduit 44 for discharge through the open end 46 thereof into a substantially circular or annular feed trough 48. In addition, a feed screw or auger 40 extends longitudinally through the conduit 44 for facilitating moving of the feed therethrough for discharge from the open end 46 thereof, as is well known. As the hopper 14 is rotated about its longitudinal axis, the feed will thus be distributed or substantially equally dispensed to the entire trough 48.

The left end of the auger 50 as viewed in FIG. 1, is provided with a suitable gear drive mechanism generally indicated at 52 and operably connected therewith for rotation thereby. The gear drive mechanism 52 is operably connected with a sprocket 54 by a drive shaft 56 whereby the gear drive 52 is driven or actuated by rotation of the sprocket 54. The sprocket 54 is connected with the gear or sprocket 42 by a suitable chain or drive belt 58 whereby the sprocket 54 is rotated as the hopper 14 rotates about its longitudinal axis, as will be hereinafter set forth.

When it is desired to distribute feed to the trough 48, the drive assembly 38 may be activated in any well known manner, such as by the time-controlled switches (not shown), or the like, for transmitting rotation to the drive shaft 32. The shaft 32 rotates the plate 20 and thus rotates the hopper 14 about the longitudinal axis thereof as long as the drive assembly 38 is activated. The feed distribution or conveyor conduit 44 moves simultaneously with the hopper, thus moving the open end 46 thereof around the annular trough 48. The rollers 24 roll along the plate 22 for facilitating the rotation of the plate 20 and hopper 14. As the hopper 14 and plate 20 and conduit 44 are simultaneously rotated, the sprocket 54 is carried therewith. Since the sprocket 42 remains stationary and the sprocket moves concentrically therearound in the manner of a sun and planet relationship, rotation will be transmitted to the sprocket 54 by the belt or chain 58. Rotation of the sprocket 54 actuates the gear drive mechanism 52 for rotating the auger 50.

The hopper valve (not shown), or the like, may be opened simultaneously with the actuation of the drive assembly 38, as is well known, whereby feed will be dispensed from the interior of the hopper into the feed distribution tube 44. The feed will move downward through the tube 44 by gravity, and the rotation of the feed screw or auger 50 will assure an efficient movement of the feed through the tube 44 and discharge through the open end 46 thereof. As the tube 44 moves around the trough 48, the feed will be distributed therein substantially evenly and uniformly. Of course, the speed of rotation of the hopper 14 may be regulated as desired by the arrangement of the drive assembly 38, as is well known, to provide the optimum speed for delivery of the feed into the trough at the most desirable rate.

When the feed trough has been properly filled with feed, the drive assembly 38 may be deactivated by the time-controlled switches, or the like, and the hopper valve may be closed for ceasing the flow of feed to the trough. The feed device 10 may remain in this condition until such time as it is deemed necessary to replenish the supply of feed in the trough 48.

Of course, if desired, the entire apparatus 10 may operate continually to supply feed to the trough 48, if field circumstances required such type operation. Alternatively, the drive assembly may be manually actuated at selected time intervals rather than using time-controlled switches, if desired.

From the foregoing it will be apparent that the present invention provides a novel self-feeding storage device for storing a quantity of feed and for automatically delivering the feed into a feed trough as required for feeding of livestock, or the like. The novel feed dispenser apparatus comprises a storage hopper rotatably mounted on a support tower, and having a feed distribution tube carried thereby. The feed is dispensed to an annular feed trough as the hopper and feed tube rotates therearound, thus distributing the feed substantially evenly and uniformly. The novel device is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A self-feeding storage hopper for feed comprising hopper means for storing a quantity of the feed, stationary support means for supporting the hopper means, means cooperating between the stationary support means and the hopper means for transmitting rotation to the hopper means about the longitudinal axis thereof, annular feed trough means disposed around the hopper means, feed distribution means carried by the hopper means for receiving feed therefrom and movable simultaneously therewith, feed screw means provided for the feed distribution means, said feed distribution means extending from the hopper means to the proximity of the feed trough means for distributing feed from the hopper means into the feed trough means, stationary gear means carried by the stationary support means, gear means carried by the rotatable hopper and movable therewith in a concentric path around the stationary gear means, drive means extending between the stationary gear means and movable gear means for driving the movable gear means during rotation of the hopper means, said movable gear means being operably connected with the feed screw means for actuation thereof during rotation of the hopper means.

2. A self-feeding storage hopper for feed as set forth in claim 1 wherein the means for transmitting rotation to the hopper means includes a first support plate carried by the stationary support means, a second support plate rotatably supported by the first support plate, roller means interposed between the first and second support plate means for facilitating relative movement therebetween, means connecting the hopper means with the second support plate, and drive means for transmitting rotation to the second support plate for simultaneous rotation of the hopper means.

3. A self-feeding storage hopper for feed as set forth in claim 1 wherein the feed distribution means includes a feed tube in communication with the hopper means for receiving the feed therefrom nd having one open end disposed in the proximity of the feed trough for dispensing the feed thereto, and said feed screw means comprises an augar extending longitudinally within the feed tube for facilitating movement of the feed therethrough.

4. A self-feeding storage hopper for feed as set forth in claim 2 wherein the roller means includes a plurality of circumferentially spaced roller members journalled on the second support plate, each of said rollers being disposed radially on the second support plate for facilitating rotation of the second support plate with respect to the first support plate.

* * * * *